United States Patent [19]
Clonts

[11] 3,754,377
[45] Aug. 28, 1973

[54] GAS-LIQUID MASS TRANSFER PROCESS

[75] Inventor: Kenyon E. Clonts, Houston, Tex.

[73] Assignee: Merichem Company, Houston, Tex.

[22] Filed: Nov. 17, 1972

[21] Appl. No.: 307,470

Related U.S. Application Data

[63] Continuation-in-part of Ser. No. 161,207, July 9, 1971, abandoned.

[52] U.S. Cl............................ 55/73, 55/90, 55/233
[51] Int. Cl............................................. B01d 53/16
[58] Field of Search ................... 55/36, 73, 84, 90, 55/91, 226, 233, 228; 261/94, 112; 423/210

[56] References Cited
UNITED STATES PATENTS

| | | | |
|---|---|---|---|
| 3,403,498 | 10/1968 | Pasha | 55/90 |
| 3,391,988 | 7/1968 | Friess et al. | 55/73 |
| 3,505,175 | 4/1970 | Zalles | 55/91 |
| 2,947,383 | 8/1960 | Schytic et al. | 55/90 |

*Primary Examiner*—Charles N. Hart
*Attorney*—Jefferson D. Giller et al.

[57] ABSTRACT

A component of at least one of two fluids is transferred into the other by introducing a liquid onto the surface of fibers extending generally linearly along a conduit with the fibers filling the cross-sectional area of at least a portion of the length of the conduit and being wetted by the liquid, flowing a gas through the conduit past the fibers thereby dragging a film of the liquid along the fibers, collecting the liquid in a gravity separator approximate the downstream end of the fibers and then separately removing the two fluids from the separator.

5 Claims, 1 Drawing Figure

Patented Aug. 28, 1973
3,754,377
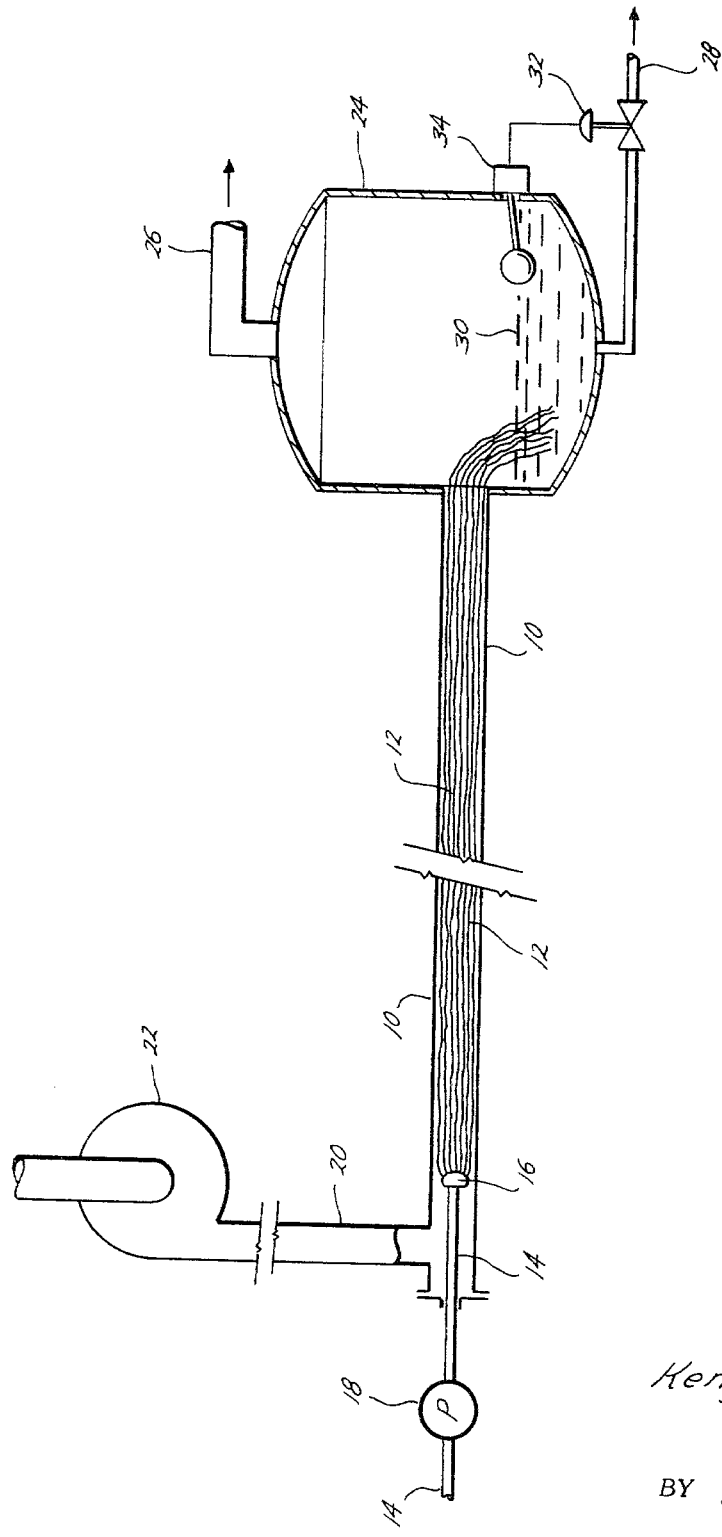
Kenyon E. Clonts
INVENTOR.
BY Jefferson D. Giller
James F. Weiler
Dudley R. Dobie, Jr.
ATTORNEYS

GAS-LIQUID MASS TRANSFER PROCESS

CROSS-REFERENCES TO RELATED APPLICATIONS

This is a continuation-in-part of U. S. Pat. application Ser. No. 161,207 filed July 9, 1971 and now abandoned by Kenyon E. Clonts for Gas-Liquid Mass Transfer Process.

BACKGROUND OF THE INVENTION

The field of art to which the invention pertains is gas-liquid mass transfer, for example the removal of pollutants from an air stream.

One conventional way to transfer a component between a gas and a liquid is the use of a spray absorption tower in which a liquid is sprayed into the top of a tower and falls by gravity against a countercurrent rising stream of gas. One of the difficulties with spray absorption towers is that the descending liquid becomes entrained in the rising gas in the form of small droplets or fog which contain a more concentrated amount of the material removed from the air stream than is contained in the air. The quantity of liquid entrained in such fog is typically on the order of 2 pounds per 100 cubic feet of gas. This represents a loss if the material is valuable. If the material is harmful, this concentration is undesirable to have present in the gas stream and as a result auxiliary equipment is necessary to remove this mist. Further, a considerable amount of energy is required to move the liquid to the top of the spray absorption tower and spray it under proper pressure conditions.

The present invention creates large interfacial boundaries between the gas and liquid with very low energy requirements and does not produce visible entrainment of liquid in the gas stream. Typically, this lack of visible entrainment means the air stream contains less than about 0.002 pounds of liquid droplets per 100 cubic feet of gas.

SUMMARY OF THE INVENTION

It is a general object of the present invention to provide a process for gas-liquid mass transfer which eliminates the high energy needs sometimes required in spray absorption towers and undesirable mists.

Another general object is to provide such a process in which a component of one of two fluids is transferred to the other through a liquid film on fibers which liquid film is dragged along the fibers by a flow of gas.

Other and further objects, features and advantages will be apparent from the following description of the present invention given for the purpose of disclosure.

The present invention is based upon the discovery that excellent results are obtained in transferring a component of one fluid to another by (a) introducing a liquid onto an upstream surface portion of a plurality of fibers extending generally along and secured in a conduit, the fibers filling the cross-sectional area of at least a portion of the length of the conduit and being wetted by the liquid, (b) flowing the gas through the conduit and past the fibers in a direction from the upstream portion of the fibers toward a downstream end of the fibers thereby dragging a film of the liquid along the fibers, the velocity of the gas being less than that which would cause visible entrainment of liquid droplets in the gas stream at the downstream end of the fibers, (c) collecting the liquid leaving the downstream end of the fibers in a gravity separator approximate the downstream end of the fibers, and (d) separately removing the liquid and gas from the separator.

With the fibers being wetted by the liquid (sometimes herein called "the constrained phase"), the movement of the gas (sometimes herein called "the continuous phase") through the conduit will cause the liquid to form a film on the fibers and then move the film in a downstream direction in the conduit. Because the liquid film on a fiber will completely surround the fiber, this film is held to that fiber by both the wetting action (adhesion) and the surface tension around the curvature of the fiber. This reduces considerably the tendency of the liquid film to come free from the fiber and be dispersed in the continuous phase when compared to what occurs with a film on a flat surface such as a disc.

As the film of the constrained phase is dragged downstream along the fibers by the continuous phase, the interface between the two fluids is constantly changed, thereby increasing the rate of transfer of a component between the two fluids.

A gravity separator is placed approximate the downstream end of the fibers so that the liquid film passes from the fibers immediately into the gravity separator and is collected prior to it becoming dispersed in the continuous phase.

The compoent that is transferred between the fluids may be transferred either into or out of the liquid film on the fibers. The transfer may be the result of a chemical reaction at the interface such as the removal of acidic constituents of an air stream by reaction with a base in an aqueous solution or the transfer may be without a chemical reaction, such as by absorption by either the liquid or the gas.

The fiber should be a material which will not contaminate the process or be destroyed by it, such as by corrosion. Glass fibers are presently preferred for most applications.

BRIEF DESCRIPTION OF THE DRAWING

The drawing is a schematic illustration of a presently preferred apparatus which can be used with the process of the present invention.

DESCRIPTION OF THE PREFERRED EMBODIMENT

Referring to the drawing, a conduit 10 has in it a bundle of elongate glass fibers 12 filling the conduit 10 for a portion of its length. These glass fibers 12 are secured to a tube 14 at a perforated node 16. The tube 14 extends beyond one end of the conduit 10 and has in it a metering pump 18 which pumps the liquid through the tube 14 and onto the fibers 12.

Connecting with the conduit 10 upstream of the node 16 is an inlet pipe 20 having in it a blower 22. This blower 22 supplies the gas through the inlet pipe 20 and into the conduit 10.

At the downstream end of the conduit 10 is a gravity separator 24 into which the downstream end of the fibers 12 extend. In an upper portion of the gravity separator 24 is an outlet 26 for the gas and at a lower portion an outlet 28 for the liquid with the level of the interface 30 between the two fluids being controlled by a valve 32 in an outlet line 28 acting in response to a liquid level controller indicated generally by the numeral 34.

In operation of the apparatus of this drawing, liquid, such as a caustic aqueous solution, is introduced through the tube 14 and onto the fibers 12. A gas, such as air containing acidic constituents, is introduced into the conduit 10 through the inlet pipe 20. The fibers 12 will be wetted by the aqueous caustic solution. The aqueous caustic solution will form a film on the fibers 12 which will be dragged downstream through the conduit 10 by the passage of air mixture through the same conduit. Both fluids will be discharged into the separator 24 but with the volume of the air being greater because the aqueous caustic will move at a lower velocity than the air. During the relative movement of the air with respect to the aqueous caustic film on the fibers, a new interfacial boundary between the air and the aqueous caustic solution is continuously being formed, and as a result fresh aqueous caustic solution is brought in contact with this surface and allowed to react with the acidic content of the air.

In the separator 24, the aqueous caustic solution will collect in the lower portion. The interface 30 within the separator 24 is normally kept at a level above the bottom of the downstream end of the fibers 12 so that the aqueous caustic film can be collected directly in the bottom of the separator without it being dispersed into the air.

Set forth hereafter are various examples illustrating the process of the present invention. In all examples, there was no visible entrainment of liquid droplets in the gas leaving the tube 10.

EXAMPLE 1

This example was a test run with approximately 96,000 glass fibers 6 inches in length in a ¼-inch I.D. glass tube. The liquid that was moved through this tube as the constrained phase was a 20 percent aqueous solution of sodium hydroxide with the movement being at the rate of 10 cc. per hour. The gas that was moved through the tube was a mixture of 7.8 percent methyl mercaptan in air at the inlet end of the tube with this gaseous mixture moving through the tube at a rate of one standard cubic foot per hour. The methyl mercaptan concentration of the air was measured by a gas chromatograph and showed a 92 percent removal of the methyl mercaptan.

EXAMPLE 2

This example was the same as Example 1 except that the gas that entered the tube was a 6.4 percent mixture of methyl mercaptan in air and the gas flowed at the rate of 1.7 standard cubic feet per hour. 56 percent of the methyl mercaptan was removed.

EXAMPLE 3

This example is similar to Example 1 except that the caustic rate was 20 cc. per hour, the concentration of methyl mercaptan in the inlet air stream was 7 percent and the gas flowed through the tube at the rate of two standard cubic feet per hour. Here, measurement showed a 73 percent removal of the methyl mercaptan.

From the foregoing discussions, examples and description of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:

1. In a process for transferring material between a liquid and a gas during which transfer and as a part thereof a component of one of the fluids is transferred to the other, the improvement comprising:
    a. introducing the liquid onto an upstream surface portion of a plurality of fibers extending generally linearly along and secured in a conduit, the fibers filling the cross-sectional area of at least a portion of the conduit's length and being wetted by the liquid,
    b. flowing the gas through the conduit and past the fibers in a direction from the upstream portion of the fibers toward a downstream end of the fibers thereby dragging a film of the liquid along the fibers, the velocity of the gas being less than that which would cause visible entrainment of liquid droplets in the gas at the downstream end of the fibers,
    c. collecting the liquid leaving the downstream end of the fibers in a gravity separator approximate the downstream end of the fibers, and
    d. separately removing the liquid and gas from the separator.

2. The process of claim 1 in which the fibers are selected from the group consisting of glass fibers and steel fibers.

3. The process of claim 1 in which the liquid includes a base in an aqueous solution.

4. The process of claim 2 in which the liquid includes a base in an aqueous solution.

5. The process of claim 1 in which the liquid includes an aqueous solution of sodium hydroxide and the gas includes air and methyl mercaptan.

* * * * *